(12) United States Patent
Kwon et al.

(10) Patent No.: US 8,094,211 B2
(45) Date of Patent: Jan. 10, 2012

(54) METHOD AND APPARATUS FOR OBTAINING IMAGE USING ENTROPY

(75) Inventors: Jae-hyun Kwon, Yongin-si (KR); Seok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 12/479,041

(22) Filed: Jun. 5, 2009

(65) Prior Publication Data

US 2009/0303347 A1 Dec. 10, 2009

(30) Foreign Application Priority Data

Jun. 9, 2008 (KR) .................. 10-2008-0053662

(51) Int. Cl.
*H04N 5/235* (2006.01)

(52) U.S. Cl. .................................................. 348/229.1
(58) Field of Classification Search ............... 348/229.1
See application file for complete search history.

(56) References Cited

U.S. PATENT DOCUMENTS 5,387,930 A * 2/1995 Toh ........................... 348/222.1
6,151,564 A * 11/2000 Vescovi et al. ............... 702/150

* cited by examiner

*Primary Examiner* — James Hannett
(74) *Attorney, Agent, or Firm* — NSIP Law

(57) ABSTRACT

An image obtaining method and apparatus are provided. The method of obtaining an image by an image obtaining apparatus includes calculating entropy of an input image, determining an optimal exposure time at which the entropy reaches a maximum value, and obtaining an image based on the determined optimal exposure time.

12 Claims, 7 Drawing Sheets

METHOD AND APPARATUS FOR OBTAINING IMAGE USING ENTROPY

CROSS REFERENCE TO RELATED APPLICATION(S)

This application claims the benefit under 35 U.S.C. §119(a) of a Korean Patent Application No. 10-2008-0053662, filed Jun. 9, 2008, the disclosure of which is hereby incorporated by reference in its entirety for all purposes.

BACKGROUND

1. Field

The following description relates to a method and apparatus for capturing an image.

2. Description of the Related Art

Typically, digital image processing devices such as digital cameras have an auto exposure function which automatically controls the exposure time using an exposure control algorithm. The brightness of a captured image may depend on the amount of light and the amount of light may be controlled by causing a shutter to open for duration of time appropriate for a desired level of brightness. For example, to obtain the desired level of brightness, an auto exposure control algorithm may be configured to increase a shutter speed where detected brightness is greater than a predetermined value, and otherwise decrease the shutter speed to adjust the brightness of the captured image.

However, it may not be easy to find adequate brightness for an image to be captured, and a user may not obtain a satisfactory image only with the conventional auto exposure function. For example, when a user takes a photograph in bright conditions, such as when the user photographs the sun, photographs an object against the sun, or photographs an object near a window, the object may appear dark while the background is extremely bright in comparison. In such a case, it is hard to obtain a clear image of the object.

SUMMARY

In one general aspect, there is provided an apparatus and method of obtaining an image which enables achieving the maximum information content from a photographed scene by obtaining an image of the scene with the exposure time at which entropy of the image reaches its maximum value.

In another general aspect, there is provided a method of obtaining an image by an image obtaining apparatus, the method including calculating entropy of an input image, determining an optimal exposure time at which the entropy reaches a maximum value, and obtaining an image based on the determined optimal exposure time.

The determining of the optimal exposure time may include determining an exposure time of an image with a maximum entropy value from among images obtained by increasing the exposure time.

The determining of the optimal exposure time may include obtaining three images with different exposure times and calculating the entropy of each of obtained images, and determining the optimal exposure time at which the entropy reaches the maximum value by substituting three exposure times and three entropy values of the images in a quadratic function regarding a relationship between entropy and an exposure time.

The method may further include determining whether an average brightness of the input image falls within a predetermined target brightness range, wherein the entropy of the input image is calculated in response to the average brightness falling within the predetermined target brightness range.

The calculating of the entropy may include dividing the input image into one or more regions, calculating the entropy of each of the divided regions, and calculating an average entropy value of the input image using the calculated entropy of each of the divided regions.

The calculating of the average entropy value may include obtaining the average entropy value based on a weight assigned to the one or more regions.

In still another general aspect, there is provided a method of obtaining an image of a scene divided into one or more regions, by an image obtaining apparatus, the method including obtaining one or more images of the scene with different exposure times, obtaining entropy of each divided region of each of the one or more images, determining an optimal exposure time at which entropy reaches a maximum value for each of the one or more divided regions of the scene, and obtaining an image for each of the one or more divided regions of the scene with the respective optimal exposure time or times.

The method may further include compositing the obtained images, wherein the scene is divided into at least two regions.

In yet another aspect, there is provided a method of obtaining an image by an image obtaining apparatus, the method including obtaining images from each of at least two image sensors that have different light receiving ranges, calculating entropy of each of the obtained images, determining an optimal exposure time at which the entropy of an image reaches a maximum value for each of the at least two image sensors, obtaining an image from each of the at least two image sensors by controlling an exposure time of each image sensor based on the corresponding optimal exposure time, and compositing the obtained images.

The compositing of the obtained images may include extracting at least one object from each of the images which are obtained by the respective image sensors by controlling the corresponding exposure time, and compositing the obtained images by assigning a weight to an image, from among the obtained images, which includes an object with a higher entropy.

In still further aspect, there is provided an apparatus for obtaining an image, including an image pickup unit configured to obtain an image, an entropy calculating unit configured to calculate entropy of the obtained image, an exposure time determining unit configured to determine an optimal exposure time at which the entropy reaches a maximum value, and an exposure control unit configured to control the image pickup unit to obtain an image with the determined optimal exposure time.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The amount of information of an image may be calculated by use of information entropy. Borrowing the term from the concept of entropy, the information entropy is used to explain the amount of information of a signal or an event. The entropy of an image is a measure of the average amount of information of the image, which varies with the exposure time of the camera. An image reaches the maximum entropy at an optimal exposure condition which is not too dark or too bright.

Entropy may be calculated as the mean of information. The information I(E) may be obtained by Equation 1 where a probability of occurrence of a random event is P(E).

$$I(E) = \log \frac{1}{P(E)} = -\log P(E) \qquad \text{[Equation 1]}$$

Here, when possible events are $\{a_1, a_2, \ldots, a_j\}$, the probability of the events are $\{P(a_1), P(a_2), \ldots P(a_j)\}$ and entropy H may be obtained by Equation 2.

$$H = -\sum_{j=1}^{J} P(a_j) \log P(a_j) \qquad \text{[Equation 2]}$$

In an image, brightness values may be substituted for the possible events. For example, in the case of a black-and-white image, 'j' may be a value of brightness between 0 and 255, and the probability may be a value between 0 and 1. In the case of a red-green-blue (RGB) color image, entropy of each of RGB channels may be calculated and the calculated entropy values are averaged to obtain a net entropy value. In another example, the color image may be converted into a black-and-white image, and the entropy of the black-and-white image may be calculated.

In some implementations, an image may be divided into one or more regions to calculate entropy of each region. Then, all the calculated entropy values are averaged to obtain a net entropy value of the image.

Figure 1:
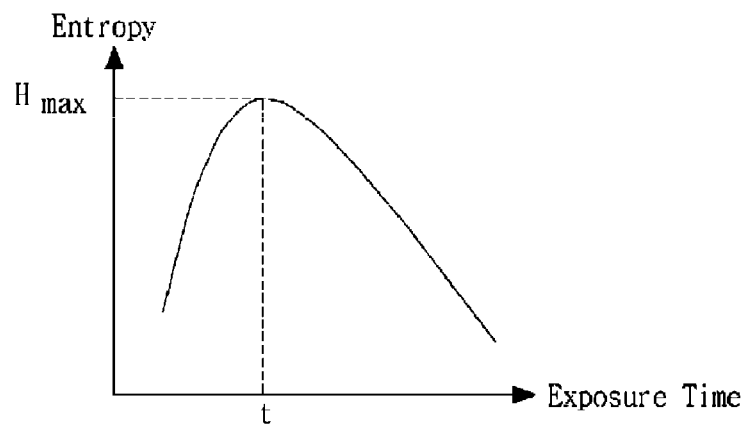
FIG. 1 is a graph illustrating a relation between an exposure time and an entropy value.

FIG. 1 illustrates a relation between an exposure time and an entropy value.

Referring to FIG. 1, the entropy value reaches its maximum at the optimal exposure time t. The exposure time and the entropy value may be represented as a quadratic function shown in Equation 3.

$$H = \alpha \cdot t^2 + \beta \cdot t + \gamma \qquad \text{[Equation 3]}$$

Here, when variables $\alpha$, $\beta$, and $\gamma$ are given, the exposure time t of an image with the maximum entropy may be obtained using Equation 3.

Figure 2:
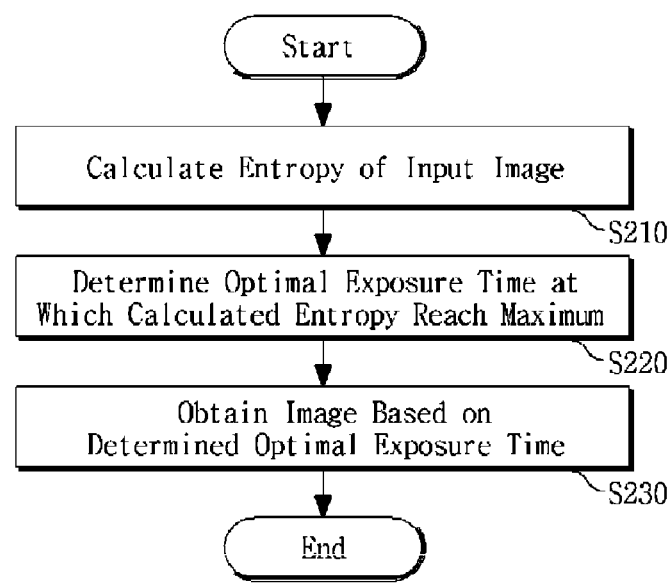
FIG. 2 is a flowchart illustrating a method of obtaining an image according to an exemplary embodiment.

FIG. 2 is a flowchart illustrating a method of obtaining an image according to an exemplary embodiment.

In operation S210, entropy of an input image is calculated. For example, the entropy may be calculated using Equation 2 as described above. When the image is a black and white image, to calculate the entropy of the black-and-white image, a histogram may be constructed based on the number of pixels of each brightness value, and the probability of each brightness value may be calculated using the histogram. In addition, in an image capturing apparatus such as a camera, a look-up table containing log values with respect to input values may be used to expedite the log calculation to obtain the entropy.

In operation S220, an optimal exposure time t at which the calculated entropy reaches its maximum is determined.

In operation S230, an image is obtained controlling the exposure time based on the determined optimal exposure time.

The calculating of the entropy in operation S210 may include the following operations. For example, the input image may be divided into one or more regions, and entropy of each divided region is calculated. Then, the average entropy is obtained from the calculated entropy values of the divided regions, and the obtained average entropy is used as a net entropy value of the input image.

Further, the average entropy may be calculated based on a weight assigned to at least one of the one or more divided regions.

According to an aspect, an image to be input for entropy calculation may not be a high-resolution image, but a preview image obtained by reducing the input image. Since entropy is not related to the size of an image, but related to the distribution of brightness values in the image, entropy for the original input image may be obtained even from entropy of the preview image created by reducing the original input image. Therefore, by using a preview image obtained in a preview mode of an image capturing apparatus such as a camera, the amount of calculation for entropy may be reduced.

Figure 3:
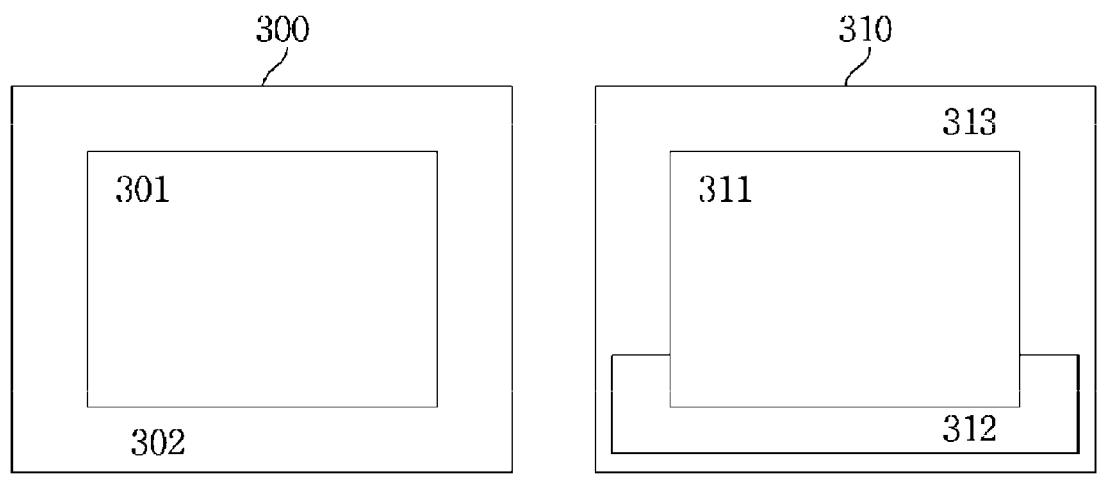
FIG. 3 is a block diagram illustrating examples of an image that is divided according to an exemplary embodiment.

FIG. 3 illustrates examples of an image that is divided according to an exemplary embodiment.

For example, an image may be divided into two or more regions and a weight index may be assigned to a region whose entropy is desired to be obtained.

Referring to FIG. 3, the image 300 is divided into a center region 301 and a peripheral region 302. Since an object to be photographed is generally placed in the center region 301, a weight for the entropy calculation may be assigned more to the center region 301 than the peripheral region 302.

As another example, an image 310 may be divided into three regions 311, 312, and 313 and weights may be assigned to a center region 311, a sub region 312, and a peripheral region 313 to calculate entropy. This entropy calculation using image division as applied to the image 310 may be applicable for a portrait image.

The images 300 and 310 described above with reference FIG. 3 are only exemplary and it is understood that an image may be divided into several regions in various forms. Entropy may be calculated for each divided region, and the calculated values of entropy may be averaged to obtain the average entropy which is used as a net entropy of the image.

Figure 4:
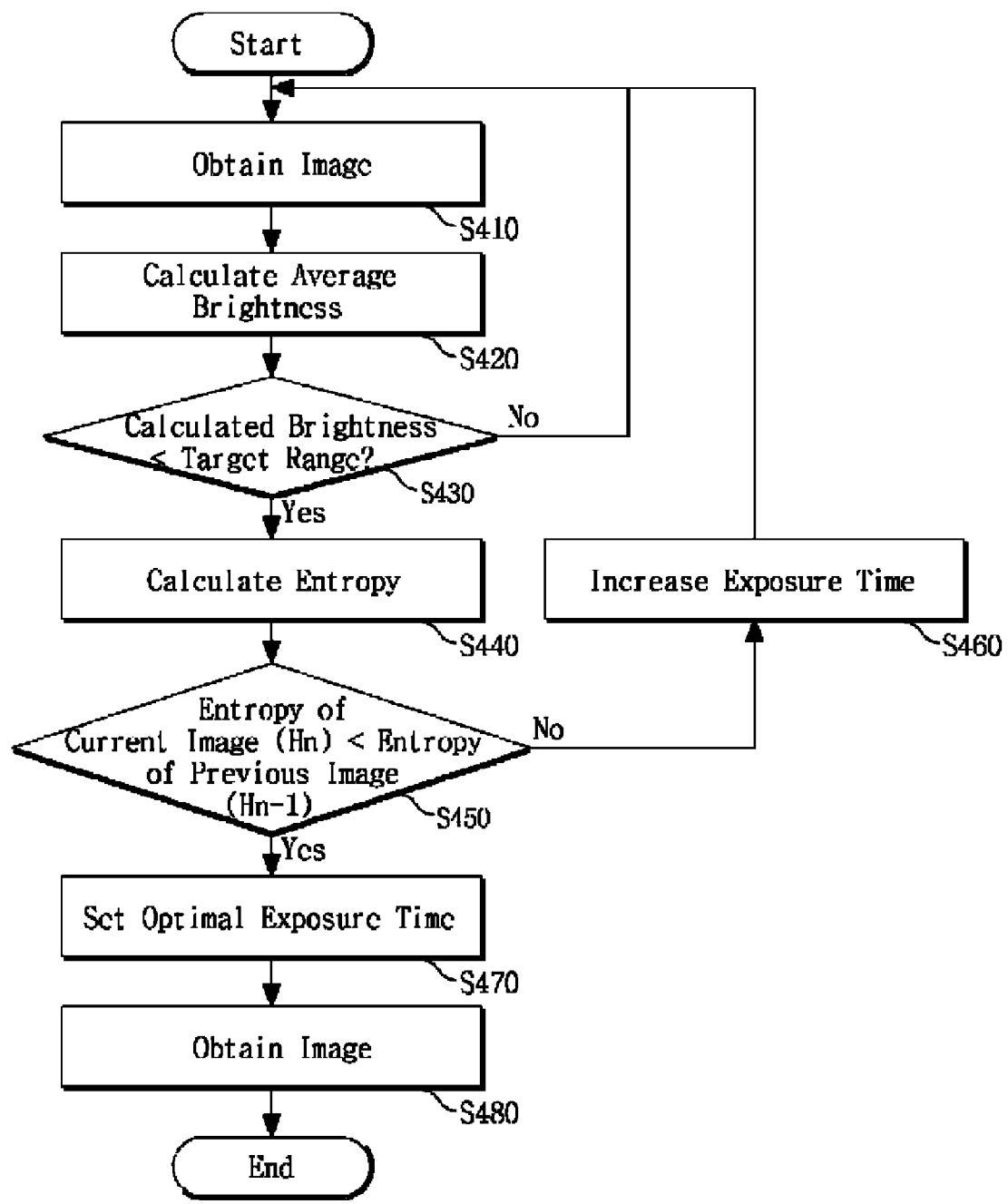
FIG. 4 is a flowchart illustrating a method of obtaining an image according to another exemplary embodiment.

FIG. 4 is a flowchart illustrating a method of obtaining an image according to another exemplary embodiment.

In operation S410, an image is obtained.

In operation S420, the average brightness value of the image is calculated.

In operation S430, it is checked whether the calculated average brightness value is within a predetermined range of target brightness.

In operation S440, where the average brightness value of the image is within the predetermined range of target brightness, entropy of the image is calculated.

For example, to calculate entropy of an image, where images are obtained by increasing the exposure time, an exposure time for an image that has the maximum entropy may be determined as an optimal exposure time of the image. The optimal exposure time may be determined by use of a hill-climbing method in which entropy of an image is charted against the exposure time, wherein the optimal exposure time may be determined as a point before entropy starts to decrease after increasing relative to increasing exposure time.

Referring back to FIG. 4, in operation S450, first entropy $H_n$ obtained from a current input image and second entropy ($H_{n-1}$) obtained from a previous input image are compared.

In operation S460, where the first entropy $H_n$ is greater than the second entropy ($H_{n-1}$), increase the exposure time and then, repeat the operation S410 for capturing an image with the increased exposure time.

Where the first entropy $H_n$ is equal to the second entropy ($H_{n-1}$), the first entropy $H_n$ may be determined as the maximum entropy. Where the first entropy $H_n$ is smaller than the second entropy ($H_{n-1}$), the second entropy ($H_{n-1}$) may be determined as the maximum entropy. As another implementation, entropy of an image obtained by reducing the exposure time may be compared with the first entropy $H_n$ or the second entropy ($H_{n-1}$) to determine the maximum entropy in operation S460.

In operation S470, the optimal exposure time corresponding to the maximum entropy is determined.

In operation S480, an image with the maximum entropy is obtained based on the determined optimal exposure time.

The operations S410 to S430 may be selectively performed to control the exposure time using entropy where the average brightness falls within a predetermined range of target brightness values, for example, between 0 and 255 of a black-and-white image. This is because the control of the exposure using entropy may not be effective for a too bright or dark image. Furthermore, when images are obtained by increasing the exposure time, an image currently captured by an image capturing apparatus may become significantly different from a previously captured image so that the brightness of the image is likely to exceed the range of target brightness. In this case, exposure control using entropy may not be effective.

Figure 5:
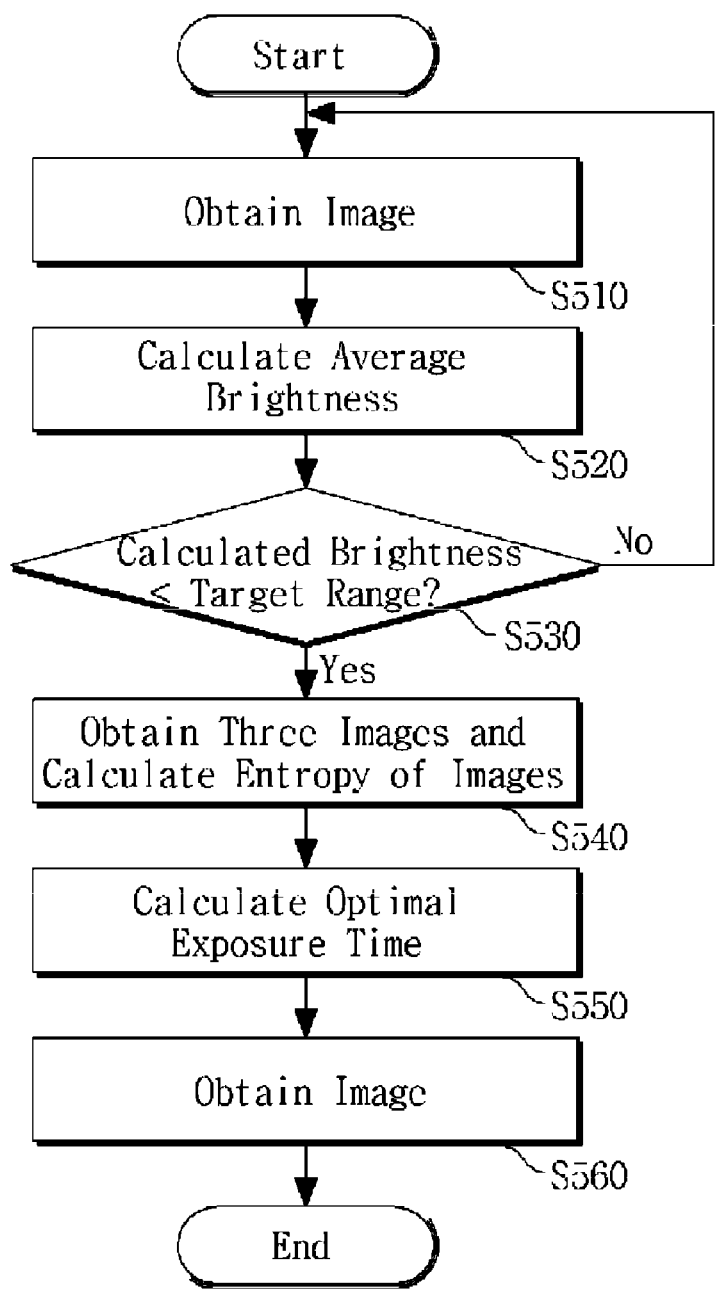
FIG. 5 is a flowchart illustrating a method of obtaining an image according to still another exemplary embodiment.

FIG. 5 is a flowchart illustrating a method of obtaining an image according to still another exemplary embodiment.

In operation S510, an image is obtained.

In operation S520, the average brightness value of the obtained image is calculated.

In operation S530, it is checked if the calculated average brightness value falls within a predetermined range of target brightness.

In operation S540, where the average brightness value is within the predetermined range of target brightness, three images are obtained with different exposure times, and entropy of each obtained image is calculated.

In operation S550, the optimal exposure time at which the entropy reaches its maximum is calculated based on the three exposure times and three entropy values of the three obtained images.

As an example, three simultaneous equations may be obtained by substituting three exposure times and three corresponding entropy values of the obtained images in a quadratic function like Equation 3 regarding the relationship between entropy and an exposure time.

By using the simultaneous equations, values of $\alpha$, $\beta$, and $\gamma$ are obtained. Based on the values of $\alpha$, $\beta$, and $\gamma$, the optimal exposure time t at which the entropy is the maximum may be obtained from the Equation 3.

In operation S560, an image is obtained by controlling the exposure time based on the determined optimal exposure time. In the method described above, the operations S610 to S630 may be selectively performed.

Figure 6:
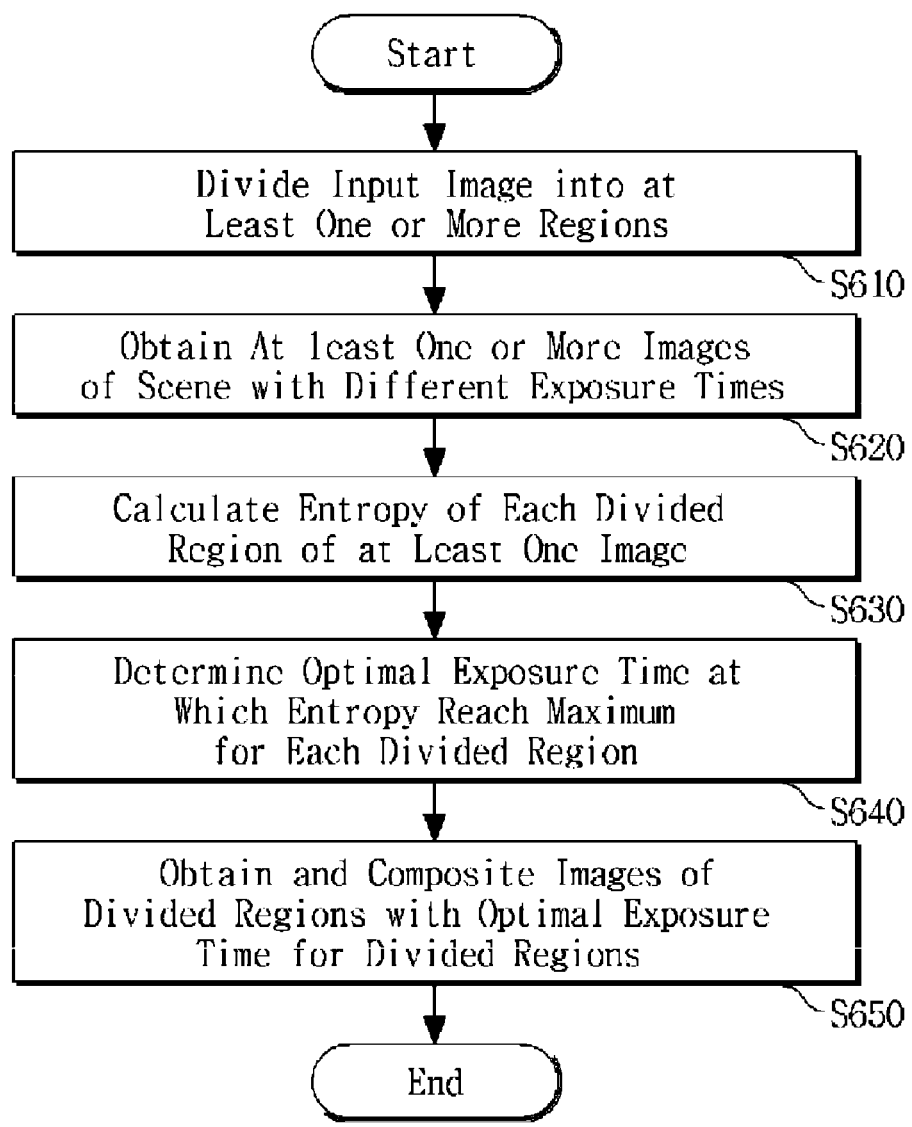
FIG. 6 is a flowchart illustrating a method of obtaining an image with the maximum entropy using a multiple exposure, according to an exemplary embodiment.

FIG. 6 is a flowchart illustrating a method of obtaining an image with the maximum entropy by use of a multiple exposure, according to an exemplary embodiment.

An image may be divided into a plurality of regions, and each region that achieves the maximum entropy through a multiple exposure may be obtained. Then, the entire image can be generated from the regions with the maximum entropy. Images of the regions each of which has its maximum entropy may be combined together to generate a high dynamic range (HDR) image.

Referring to FIG. 6, in operation S610, an input image of a scene is divided into one or more regions. That is, the image may be of one region or divided into, for example, two regions. As an example, an image capturing apparatus such as a camera may obtain a preview image of the scene and divide the preview image into a bright region and a dark region. As another example, a scene to be input may be divided into an object and a background using a known object segmentation algorithm.

In operation S620, one or more images of the scene are obtained with different exposure times.

In operation S630, entropy of each region is calculated for at least one of the images of the scene. For example, entropy of each divided region of a first image of the scene and entropy of each divided region of a second image of the scene are calculated, wherein the first image and the second image have different exposure times.

In operation S640, an optimal exposure time for each region of the at least one of the images is determined. The optimal exposure time may be determined using the exemplary method of FIG. 4 or 5.

In operation S650, images as many as the number of determined optimal exposure times are obtained by controlling the exposure time based on the determined optimal exposure time of each region, and the images obtained with the optimal exposure times of respective divided regions are composited together to generate a final image.

For example, when a scene is divided into a first region and a second region and an optimal exposure time of the first region and an optimal exposure time of the second region is t1 and t2, respectively, the image capturing apparatus may adjust the exposure times to t1 and t2 and obtain two images with the exposure times of t1 and t2, and use the first region of the image whose exposure time is t1 and the second region of the image whose exposure time is t2 to generate a final image by compositing the first and second regions together.

Accordingly, by combining or compositing images of the divided regions, each of which is has the maximum entropy, an HDR image with the maximum information may be generated. At least one or more images with different exposure times may undergo an image matching process to compensate for movement in the course of compositing the images of the divided regions where, for example, a movement of the camera or an object to be photographed occurs.

Figure 7:
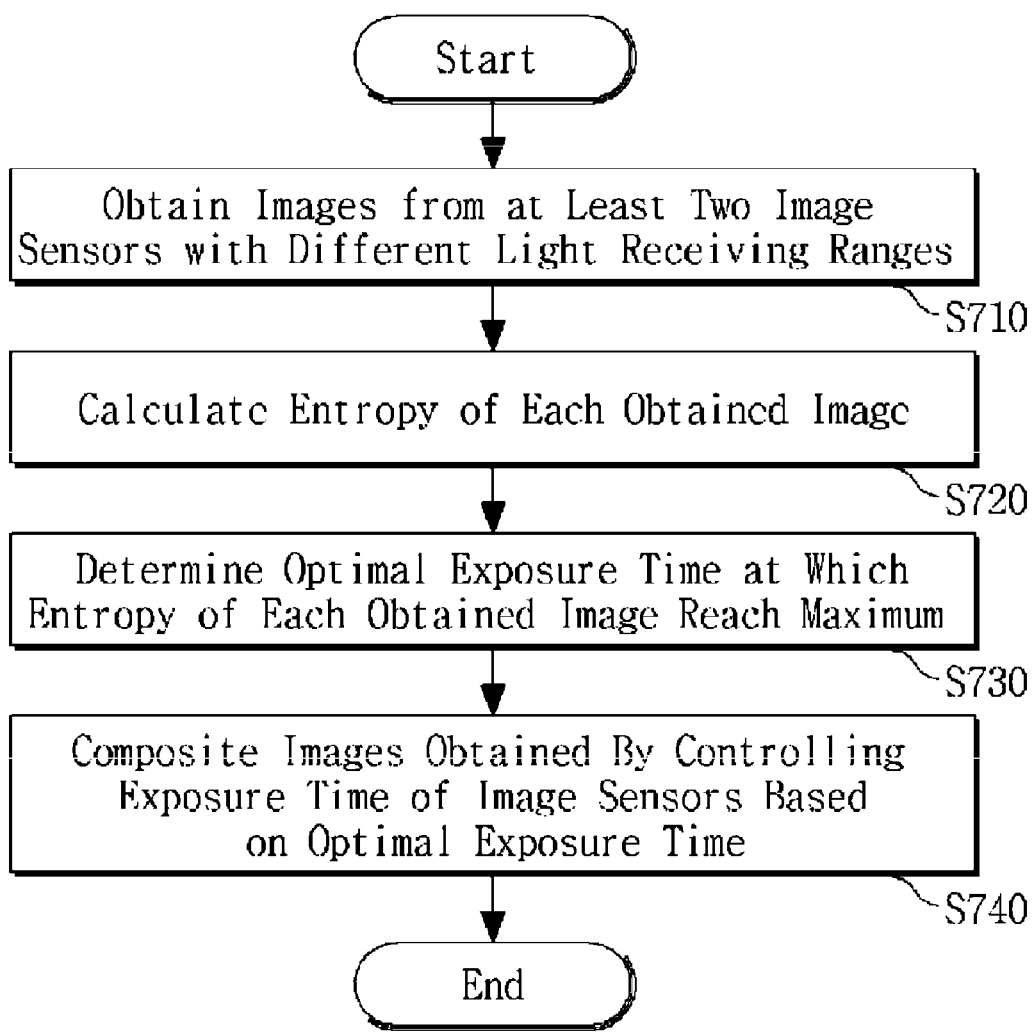
FIG. 7 is a flowchart illustrating a method of obtaining an image with the maximum entropy using a multiple-exposure sensor, according to an exemplary embodiment.

FIG. 7 is a flowchart illustrating a method of obtaining an image with the maximum entropy using a multiple-exposure sensor according to an exemplary embodiment.

At least two image sensors that have different light receiving ranges may be used to obtain at least two images. For example, two images having different exposure times may be obtained from each of the image sensors. The images from the image sensors with the maximum entropy may be composited together to generate a final image with the maximum entropy. The image sensors that have the different light receiving ranges may be a visible image sensor and an infrared image sensor, or color image sensors or ultraviolet sensing image sensors.

Referring to FIG. 7, in operation S710, at least two image sensors, for example, the visible image sensor and infrared image sensor which have different light receiving ranges, obtain images.

In operation S720, entropy of each of the images obtained by the image sensors is calculated.

In operation S730, an optimal exposure time at which the entropy of an image reaches its maximum is determined for each image sensor. To determine the optimal exposure time at which the entropy of the image reaches its maximum, each image sensor may generate images with different exposure times for a scene using the exemplary method of FIG. 4 or 5.

In operation S740, the exposure time of each image sensor is adjusted based on the corresponding optimal exposure time to obtain an image of each image sensor, and the obtained images are composited together to generate an image with larger information content.

For example, when the maximum exposure time for an image obtained by a visible image sensor is t3 and the maximum exposure time for an image obtained by an infrared image sensor is t4, the visible image sensor obtains an image with the exposure time of t3 and the infrared image sensor obtains an image with the exposure time of t4, and the obtained images are composited together. Since the visible image sensor and the infrared image sensor are located differently and have different characteristics, an image matching process may be used to adjust fields of view, disparities of the two images in the course of compositing the images.

Furthermore, to obtain an image with large information content regarding a predetermined object, at least one or more objects are extracted from images which are obtained by the respective image sensors by adjusting the exposure times, an image that has higher entropy for the predetermined object than the other images is assigned with a weight, and then all images are composited. For example, when images obtained, respectively, by the visible image sensor and the infrared image sensor are composited, and the image by the visible image sensor includes an object with higher entropy, more weight may be assigned to the image of the visible image sensor.

It is understood that a method of generating an image with the maximum entropy by compositing images obtained by image sensors with different light receiving ranges may be varied. Such images with large information content may be used for, for example, an automotive application such as a night vision, lane detection, and a pedestrian recognition, and such images may also be effectively used to provide information beyond the human visual senses.

Figure 8:
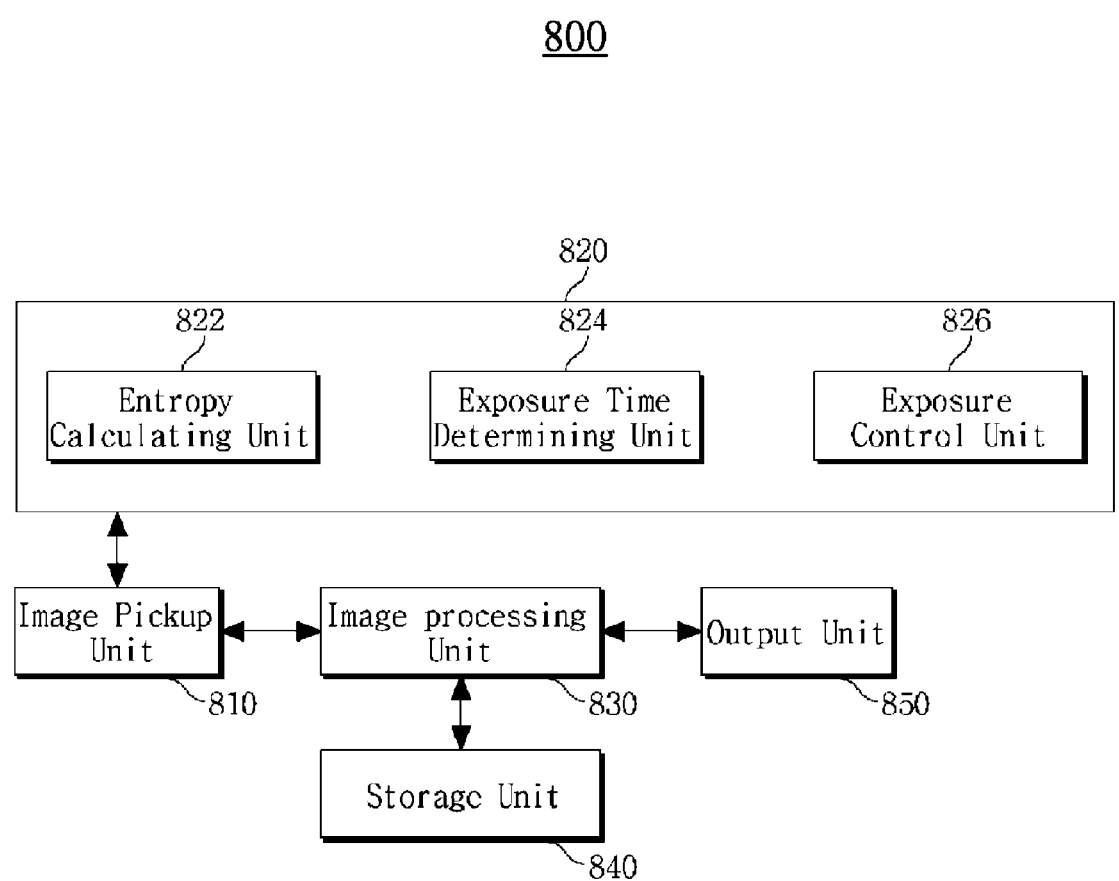
FIG. 8 is a block diagram illustrating an image obtaining apparatus according to an exemplary embodiment.

FIG. 8 illustrates an image obtaining apparatus 800 according to an exemplary embodiment. As shown in FIG. 8, the image capturing apparatus 800 includes an image pickup unit 810, an exposure setting unit 820, an image processing unit 830, a storage unit 840, and an output unit 850. The image pickup unit 810 senses or obtains an image for an exposure time set by the exposure setting unit 820. The image processing unit 830 processes the obtained image and the processed image is stored in the storage unit 840 or output by the output unit 850.

The image pickup unit 810 may include an optical unit (not shown) having a lens and a filter, and a photoelectric converting unit (not shown) including a charged coupled device (CCD) or complementary metal-oxide-semiconductor (CMOS) which converts light transferred from the optical unit into an electrical analog signal. The image pickup unit 810 may have an additional function of auto focusing or auto white balancing.

The exposure setting unit 820 determines an optimal exposure time at which entropy reaches maximum, and controls the image pickup unit 810 to obtain the image for the optimal exposure time. By exposure control of the exposure setting unit 820, an image with the maximum entropy may be obtained.

The exposure setting unit 820 may include an entropy calculating unit 822, an exposure time determining unit 824, and an exposure control unit 826. The entropy calculating unit 822 may calculate entropy of an input image. The exposure time determining unit 824 may determine an optimal exposure time at which the entropy reaches maximum. The exposure control unit 826 may control the image pickup unit 810 to obtain an image for the optimal exposure time.

For example, the exposure time determining unit 824 may determine an exposure time using a hill-climbing method. As another example, the exposure time setting unit 824 may determine the exposure time by using entropies of three images obtained by the image pickup unit 810 with different exposure times, the entropies being calculated by the entropy calculating unit 822. In this case, the exposure time calculating unit 824 substitutes three exposure times and three entropy values with respect to the three images in a quadratic function to calculate an exposure time at which the entropy reaches maximum.

To perform the method of FIG. 6, the exposure control unit 826 may control the image pickup unit 810 to obtain images with different exposure times. In this case, the entropy calculating unit 822 may divide the obtained image into one or more regions and calculate entropies of respective images of divided regions obtained with different exposure times. The exposure time determining unit 824 may determine optimal exposure times at each of which the entropy of each corresponding divided region reaches maximum. Thereafter, the image processing unit 830 may composite the images of the respective divided regions obtained with the optimal exposure times. The image processing unit 830 may perform an image matching process for motion compensation.

To perform the method of FIG. 7, additional image pickup units may be employed, and the image processing unit 830 may match and composite images obtained by the respective image pickup units.

According to certain example(s) described above, an image of a scene with maximum information content may be obtained. The exemplary methods and apparatuses described above may be applicable to, for example, an image capturing apparatus such as a digital camera, an image signal processing apparatus, an output apparatus, and a signal processing chip.

According to certain example(s) described above, one or more images are obtained with different exposure times and composited to generate an HDR image. The images may be obtained by various image capturing apparatuses, for example, a visible image sensor and an infrared image sensor, and the obtained images may be composited to generate an image which may be applicable to, for example, an automotive application such as for an HDR image, a night vision, lane detection, and pedestrian recognition.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Functional programs, instructions, codes, and code segments for accomplishing the method or operation can be easily construed by programmers skilled in the art to which the instant disclosure pertains. The computer readable medium can also be distributed over network coupled computer systems so that the computer readable instruction or code is stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of obtaining an image by an image obtaining apparatus, the method comprising:
    calculating entropy of an input image;
    determining an optimal exposure time at which the entropy reaches a maximum value based on a comparison of the calculated entropies during a first exposure time and a second exposure time; and
    obtaining an image based on the determined optimal exposure time.

2. The method of claim 1, wherein the determining of the optimal exposure time comprises determining an exposure time of an image with a maximum entropy value from among images obtained by increasing the exposure time.

3. The method of claim 1, wherein the first exposure time is separate from the second exposure time, and the determining of the optimal exposure time occurs in response to the first exposure time being substantially equal to the second exposure time.

4. A method of obtaining an image by an image obtaining apparatus, the method comprising:
    calculating entropy of an input image;
    determining an optimal exposure time at which the entropy reaches a maximum value; and
    obtaining an image based on the determined optimal exposure time, wherein the determining of the optimal exposure time comprises:
        obtaining three images with different exposure times and calculating the entropy of each of obtained images; and
        determining the optimal exposure time at which the entropy reaches the maximum value by substituting three exposure times and three entropy values of the images in a quadratic function regarding a relationship between entropy and an exposure time.

5. A method of obtaining an image by an image obtaining apparatus, the method comprising:
    calculating entropy of an input image;
    determining an optimal exposure time at which the entropy reaches a maximum value;
    obtaining an image based on the determined optimal exposure time; and
    determining whether an average brightness of the input image falls within a predetermined target brightness range,
    wherein the determining of the optimal exposure time comprises determining an exposure time of an image with a maximum entropy value from among images obtained by increasing the exposure time, and
    wherein the entropy of the input image is calculated in response to the average brightness falling within the predetermined target brightness range.

6. A method of obtaining an image by an image obtaining apparatus, the method comprising:
    calculating entropy of an input image;
    determining an optimal exposure time at which the entropy reaches a maximum value; and
    obtaining an image based on the determined optimal exposure time, wherein the calculating of the entropy comprises:
        dividing the input image into one or more regions;
        calculating the entropy of each of the divided regions; and
        calculating an average entropy value of the input image using the calculated entropy of each of the divided regions.

7. The method of claim 6, wherein the calculating of the average entropy value comprises obtaining the average entropy value based on a weight assigned to the one or more regions.

8. A method of obtaining an image of a scene divided into one or more regions, by an image obtaining apparatus, the method comprising:
    obtaining one or more images of the scene with different exposure times;
    obtaining entropy of each divided region of each of the one or more images;
    determining an optimal exposure time at which entropy reaches a maximum value for each of the one or more divided regions of the scene; and
    obtaining an image for each of the one or more divided regions of the scene with the respective optimal exposure time or times.

9. The method of claim 8, further comprising compositing the obtained images, wherein the scene is divided into at least two regions.

10. A method of obtaining an image by an image obtaining apparatus, the method comprising:
- obtaining images from each of at least two image sensors that have different light receiving ranges;
- calculating entropy of each of the obtained images;
- determining an optimal exposure time at which the entropy of an image reaches a maximum value for each of the at least two image sensors;
- obtaining an image from each of the at least two image sensors by controlling an exposure time of each image sensor based on the corresponding optimal exposure time; and
- compositing the obtained images.

11. The method of claim 10, wherein the compositing of the obtained images comprises extracting at least one object from each of the images which are obtained by the respective image sensors by controlling the corresponding exposure time, and compositing the obtained images by assigning a weight to an image, from among the obtained images, which includes an object with a higher entropy.

12. An apparatus for obtaining an image, comprising:
- an image pickup unit configured to obtain an image;
- an entropy calculating unit configured to calculate entropy of the obtained image;
- an exposure time determining unit configured to determine an optimal exposure time at which the entropy reaches a maximum value based on a comparison of the calculated entropies during a first exposure time and a second exposure time; and
- an exposure control unit configured to control the image pickup unit to obtain an image with the determined optimal exposure time.

* * * * *